J. K. P. PINE.

Collar.

No. 8,369. Reissued Aug. 13, 1878.

WITNESSES:

Achilles Schehl

C. Sedgwick

INVENTOR:

J. K. P. Pine

BY Munn & Co.

ATTORNEYS.

N. PETERS, PHOTO-LITHOGRAPHER, WASHINGTON, D. C.

UNITED STATES PATENT OFFICE.

JAMES K. P. PINE, OF LANSINGBURG, NEW YORK.

IMPROVEMENT IN COLLARS.

Specification forming part of Letters Patent No. 189,134, dated April 3, 1877; Reissue No. 8,369, dated August 13, 1878; application filed July 13, 1878.

*To all whom it may concern:*

Be it known that I, JAMES K. P. PINE, of Lansingburg, in the county of Rensselaer and State of New York, have invented a new and useful Improvement in Standing-Collars, of which the following is a specification:

The general object of my improvement is to introduce an improved standing-collar that is nearly conformed to the contour of the neck and upper portion of the chest of the person, readily self-adjustable in its proper place without side attachments, and which, in its manufacture, necessitates but little waste of material.

The invention consists of a standing-collar whose top or body, where it is joined to the band, is cut in a reverse curve in connection with a band cut in corresponding shape. The lower edges of the top and band are reversed at points between the center and ends of the top, so as to drop the end portions of the lower edges of the collar and band in a continuous but reversed sweep below the middle portion of their lower edges, and produce thereby the required spring or flare of the collar.

Figure 1:
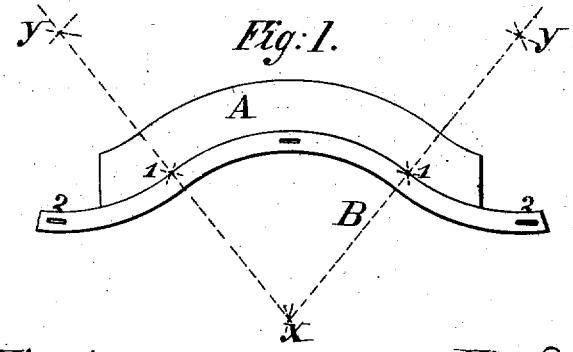
Figure 4:
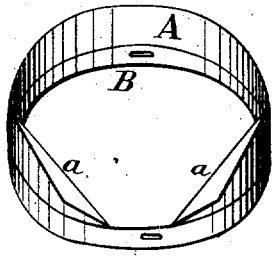
Figure 2:
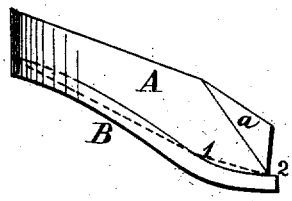
Figure 3:
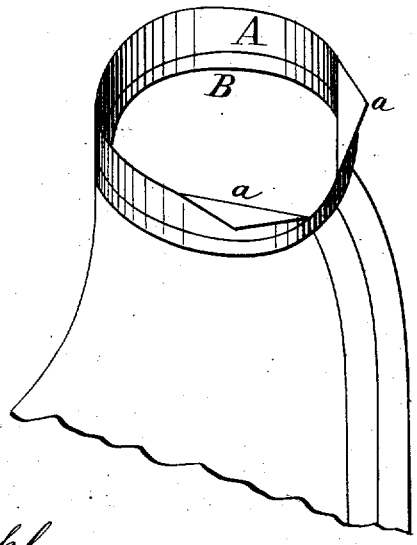

Figure 1 is a plan of my improved standing-collar, its lower edge having a line designated as a reverse curve, having arcs respectively projected from the ascertained centers *x* and *y*, showing equal radii, the former center forming the arc between the points 1 and 1 and the latter center forming an arc between the points 1 and 2 in length about one-half of the arc between the points 1 and 1. Fig. 2 is an elevation or side view of the same from the center of the collar to the extremity, showing the lap or turnover *a*. Fig. 3 is a side elevation, in perspective, designed especially to indicate the side location of the collar on the wearer and the self-adjustment to the contour of the neck and chest around the shirt-band. Fig. 4 is a similar view of the collar, showing the line of adjustment or contact on the back of the neck.

Similar letters of reference indicate corresponding parts.

A represents the top or body of my improved standing-collar, and B the band of the same. The width of the collar and the direction of its upper edge and the material used may be left to the taste of the manufacturer. The lower edge of the top, however, is cut on a continuous but reverse curve, as shown in Fig. 1, so that the middle portion of the edge forms a concave arc, while the end portions of the edge form convex arcs toward a common base-line.

The neck-band B is cut along its line of connection with the top A, as well as on its lower edge, in a reverse curve corresponding to that of the lower edge of the top, the points at which the curves of the lower edges of top and band are reversed being between the center and ends of the collar, so as to produce thereby that degree of spring or flare that is required for the comfortable fit of the collar around the neck-band of the shirt.

I have found from experience in manufacturing and using collars as commonly made that serious disadvantages arise as to comfort to the wearer when the collar is cut in a uniform straight line with corresponding band. There is discomfort and objection from the hitching up of the collar upon the shirt-band on the side in the movements of the head and neck unless the same is held on the side by pins or buttons, or else, when the collar is cut in a continuous curved line with corresponding band, there is in the wearing of the same a tendency to hug the neck too closely or to flare out too far all around the neck, and in such several conditions causing discomfort or presenting an ungainly appearance.

These objections and disadvantages I have overcome by my improved standing-collar, (seen in Fig. 1,) the pattern for which is cut so that the lower edge or line of contact with the band forms a uniform reverse curve, all parts of the concave arc between the points 1 and 1 having, to an ascertained center, *x*, radii equal to the radii formed from all points of the convex arc between the points 1 and 2 and the center *y*, the centers, respectively, of the arcs mentioned in the drawing, Fig. 1, being indicated to show accurately how my improved collar may be cut in the form shown, and the other figures are illustrations of it in general use.

As a manufacturer, I have found that a larger number of my improved collars can be cut from a given number of yards of material with less waste, and that there are, especially in the wearing of my improved collar, more desirable results in these respects, to wit: that on being placed around the neck in the usual manner, without side fastenings, there is uniformly a self-adjustment or adaptation around the band of the shirt or garment; and that in the movements of the head and neck backward or forward it readily conforms itself to the movement, retaining its first general position, and when the head is moved from side to side the collar and band attachment will not spring up or rise above the band of the shirt or garment; and that the spring of the starched collar will flare out back of the neck to a proper position, and at the sides have less flare from the neck, and in all movements of the body conduce to a comfortable feeling and give a graceful appearance; and, again, within the principle of my invention, in employing the line of the reverse curve on the lower edge of the collar, as seen in Fig. 1, I claim that by slight variations, by broken or waving lines, while retaining from the center to either extremity the general direction of the reverse curve, I still retain the same within the scope of my invention, as shown by dotted lines, Fig. 2.

Having thus described my invention, I claim as new and desire to secure by Letters Patent—

1. A standing-collar having its lower edge, where it is joined to the neck-band, cut in a reverse curve, substantially as and for the purpose set forth.

2. The collar A, having its lower edge cut in a reverse curve, as described, in combination with the band B, curved to correspond with the collar, substantially as and for the purposes set forth.

3. A standing-collar having the meeting-edges of the top and band cut on a curve that is reversed at both ends and at points between the center and ends of the collar, substantially as set forth.

4. A standing-collar having the lower edge of its band cut on a curve that is reversed at both ends and at points between the center and ends of the collar, substantially as described.

JAMES K. P. PINE.

Witnesses:

WILLARD W. SEARLE,

WM. W. KNICKERBOCKER.